United States Patent [19]

Sakurai et al.

[11] Patent Number: 4,847,613

[45] Date of Patent: Jul. 11, 1989

[54] DATA TRANSFER APPARATUS

[75] Inventors: Tutomu Sakurai, Katano; Keishiro Ota, Yawata; Saburo Kubota, Katano; Masanobu Miyata, Neyagawa; Hiroshi Fujiwara, Katano, all of Japan

[73] Assignee: Matsushita Electric Industrial Co., Ltd., Kadoma, Japan

[21] Appl. No.: 73,255

[22] Filed: Jul. 14, 1987

[30] Foreign Application Priority Data

Jul. 15, 1986 [JP] Japan ................................ 61-165830
Feb. 20, 1987 [JP] Japan ................................ 62-38483

[51] Int. Cl.$^4$ ............................................. H04Q 1/00
[52] U.S. Cl. ....................... 340/825.210; 340/825.500; 340/825.520
[58] Field of Search ...................... 340/825.05, 825.22, 340/825.2, 825.5, 825.52; 370/86, 108

[56] References Cited

U.S. PATENT DOCUMENTS

| | | | |
|---|---|---|---|
| 4,002,842 | 1/1977 | Meyr et al. | 370/86 |
| 4,225,753 | 9/1980 | Chown et al. | 370/86 X |
| 4,293,948 | 10/1981 | Soderblom | 370/86 X |
| 4,500,987 | 2/1985 | Hasegawa | 370/86 X |
| 4,517,670 | 5/1985 | Ulug | 340/825.5 X |
| 4,602,365 | 7/1986 | White et al. | 370/86 X |

*Primary Examiner*—Ulysses Weldon
*Attorney, Agent, or Firm*—Cushman, Darby & Cushman

[57] ABSTRACT

In a data transfer apparatus, as one substation in a loop type signal transfer system, e.g. for use in an automatic machine, synchronization information and address information are received and the address is checked by an address coincidence circuit; when address coincidence is detected the data information in the received signal is replaced by serialized data which is contrived by parallel-serial conversion of the parallel input data at the substation; therefore there is no need of oncestoring the entire received signal transferred, and therefore, high speed data transfer results.

2 Claims, 11 Drawing Sheets

DATA TRANSFER APPARATUS

FIELD OF THE INVENTION AND RELATED ART STATEMENT

1. FIELD OF THE INVENTION

The present invention relates to a data transfer apparatus, and more particularly to a data transfer apparatus suitable for use in automatic machines wherein many data are used.

2. DESCRIPTION OF THE RELATED ART

In recent years, as a result of popular utilizations of microprocessor, automatic machines are acquiring higher functions. In such automatic machine, sometimes several hundreds or several thousands of sensors or actuators are becoming used. Therefore, the total length of wiring in such automatic machine becomes several kilometers, and such system has more than several hundreds of input terminals and output terminals. As a result, when once trouble has happen, the trouble shooting is very difficult, thereby lowering reliability, and besides the large number of wiring makes the system expensive.

In order to decrease the number of wiring, a system, which is made by disposing a control unit called remote I/O at a close vicinity of each sensor or actuator, wherein many sensors and actuators are connected in serial multiple signal transfer system by using a single optical fiber or a single pair of wire, has been developed. In such serial multiple signal transfer system, the optical transfer system which is strong against noises is expected hopeful because there are many noises at the vicinity of the automatic machine.

Figure 10:
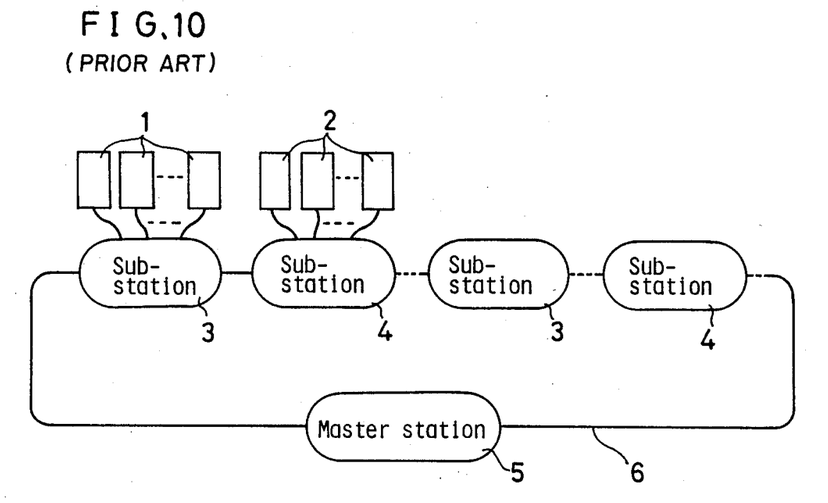
FIG. 10 is a schematic circuit diagram of a general remote I/O system configuration comprising plural substations and one master station.

FIG. 10 shows an outline arrangement of the general information transfer system comprising the remote I/O, wherein a number of input units 3, 3 and actuator units 4, 4, . . . and a controller 5 for controlling these input units 3, 3, . . . and output units 4, 4, . . . are connected in series by optical fiber or by electric wires to form a loop shaped circuit. Each input unit comprises several sensors 1, 1, . . . and each output unit has a predetermined number of actuators 2, 2, . . . In the abovementioned remote I/O system, main branches, i.e., making of passive taps, is very difficult. Therefore, in each substations, newly in each input units 3, 3 . . . or output units 4, 4, . . . , it is necessary that optical signals is once transformed into electric signals and the electric signal is transferred into the optical signal for transmission from the substations, such remote I/O system includes the following two types of transfer systems. Hereafter, the two kinds of optical transfer systems are elucidated.

Figure 11:
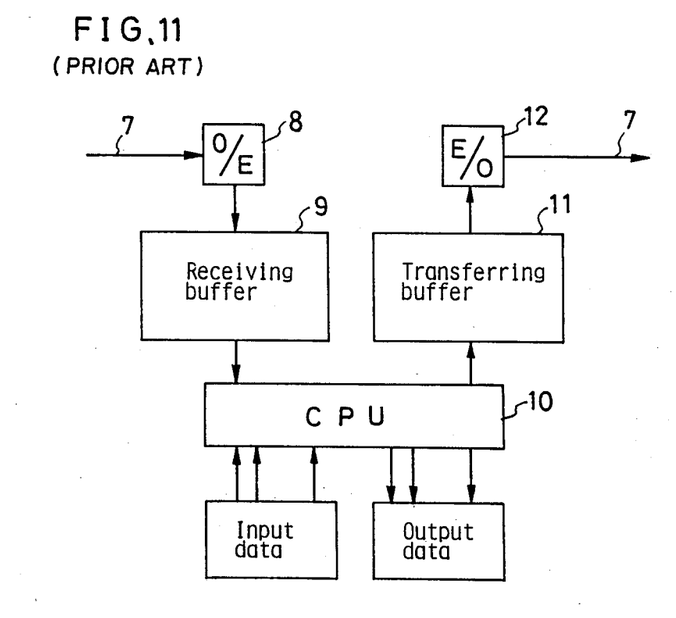
FIG. 11 is the block diagram of one example of the conventional loop system optical data transfer apparatus.

FIG. 11 shows a first conventional optical remote I/O system.

In FIG. 11, a signal transmitted through an optical fiber 7 is transformed into an electric signal by an opto-electric converter 8, and subsequently once stored in a receiving buffer 9; then the signal is, after being read and processed by a microprocessor 10, stored in a transmission buffer 11. Thereafter, the stored signal is transformed in a serial signal, and then transformed in optical signal by an electro-optical converter 12 and transmitted in the optical fiber 7.

Figure 12:
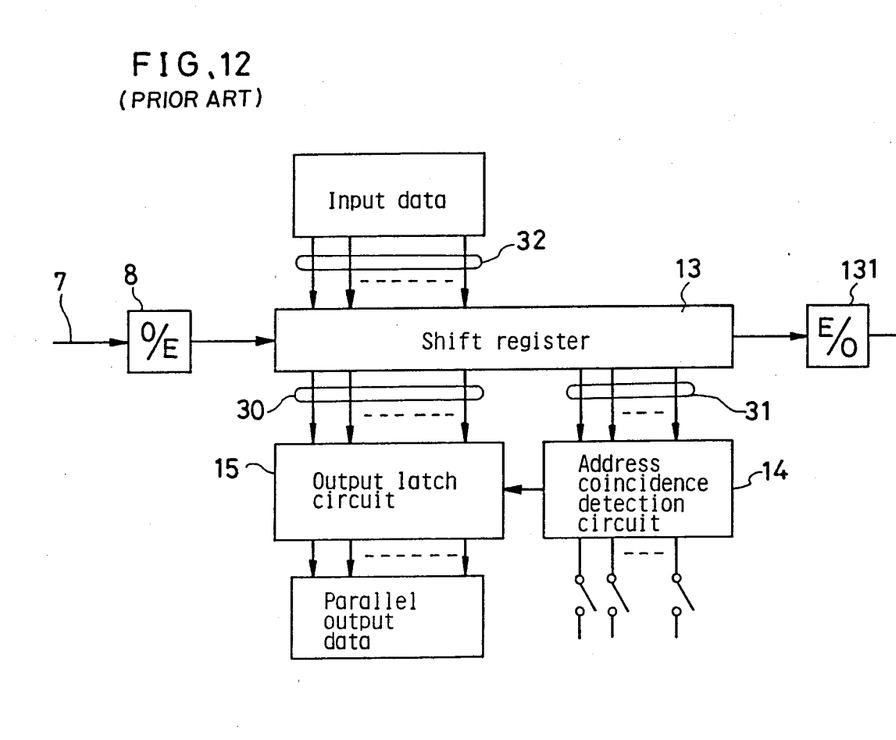
FIG. 12 is the block diagram of the second example of the conventional loop system optical data transfer apparatus.

FIG. 12 shows another conventional optical signal transfer system. In FIG. 12, an optical serial signal received by an optoelectric converter 8 is once stored in a shift resistor 13 which can perform serial-parallel conversion and parallel-serial conversion. Thereafter, when an address coincidence circuit 14 detects that this unit or substation of the loop shape system is addressed, an output latch 15 stores output data. Besides, data which is once stored in the shift resistor 13 is replaced by input data 32, and the contents of the shift resistor is parallel-serial converted and electro-optically converted by an electro-optical converter 131 and transmitted into optical fiber cable. When address does not make coincidence with the address of this unit, then the above-mentioned replacing by the input data is not made, and the incoming information once stores in the shift resistor 13 is transferred through the electro-optic transducer as it is.

In both of the above-mentioned configurations of the prior arts, the signal is transferred delaying for more than one frame transmission time, since the signal to be transferred must be once stored for all the one frame. Accordingly, in the process of transfer of the information through the loop system having such units as shown in FIG. 11 and FIG. 12, the delayings in respective units are accumulated, and therefore the response of the automatic machine becomes slow, and sometimes the automatic machine becomes uncontrollable. Therefore, in a case of necessitating quick response, auxiliary electric wirings must be used to avoid the above-mentioned inconvenience of delay.

OBJECT AND SUMMARY OF THE INVENTION

Accordingly, a primary object of the present invention is to provide a high speed data transfer apparatus which can realize high speed data transferring when used as substations in a loop.

The above-mentioned purpose can be achieved by a data transfer apparatus comprising; an address coincidence circuit for detecting coincidence of address information included in a transfer signal consisting of synchronization information, the address information and data information, by comparing the address information with a predetermined address, and for memorizing the coincidence and issuing a coincidence signal, a synchronized carrier generator for generating carrier signal which is corresponding to transfer speed (i.e. Mbps) of the transferred signal, a parallel-serial converter for converting parallel data information to serial signal by using the carrier signal issued from the synchronized carrier generator as latchtiming signal, a delay circuit for delaying the transfer signal in a manner that the part of time period of the data information in the transfer signal is issued at the same time period that the serial signal is issued, and a switch circuit for switching to insert the serial signal given thereto in place of the data information in the transfer signal given thereto through the delay circuit during a period when the coincidence signal is being given from the address coincidence circuit.

The above-mentioned data transfer apparatus can transfer data in a high speed, namely in a short time, since the whole contents of the information is no more stored in the apparatus, and only the data information is replaced at necessary stations. In other words, the high speed data transfer is possible because address coincidence is detected at the point of time of reception of the synchronization information and address information, and immediately thereafter the parallel-serial converted serial data to be transmitted from that station is inserted in the information in place of the received data information, thereby avoiding redundant storing of the whole informationed to be transferred.

In the above-mentioned high speed data transferring, since the serial signal of the synchronization information and the address information in the received signal is delayed by the serial signal delay circuit to the timing to taking-in of the input data from the outside, there is substantially no fear of disturbance of waveform due to replacing of the data information. Accordingly stable data transfer can be made.

In general, the carrier signal can be generated with a delay of about half the time of ON/OFF pulse width of the received signal, and the delay time of retransferring of the received signal by the carrier signal becomes substantially half of the ON/OFF pulse width of the received signal, and hence a considerably high speed data transfer becomes possible according to the present invention.

According to a still improved species, a data transferring of high reliability can be made by carrying out trouble checking of hardware by: Sending back data information received by substation and output from the substation to the master station and checking the sent back data information from the substation by the master station, and thus a reliable system can be provided. By such improved species, the hitherto existing shortcoming that the master station can not confirm whether data information which is running on the loop system including the master station and several substation is actually an accurate data which is not disturbed by noise or some trouble in the system, and that the errors produced in the data transfer loop could not be found in the automatic machine system.

The above-mentioned improved species of the data transfer apparatus comprises an address coincidence circuit for detecting coincidence of address information included in a transfer signal consisting of synchronization information, the address information and data information, by comparing the address information with a predetermined address, and for memorizing the coincidence and issuing a coincidence signal, a synchronized carrier generator for generating carrier signal which is corresponding to transfer speed of the transferred signal, a serial-parallel converter for converting serial data information of received transfer signal into output parallel signal by using carrier signal issued from the synchronized carrier generator as conversion timing clock, an output latch circuit for latching output parallel signal converted from the serial signal by the serial-parallel converter, a parallel-serial converter for converting the output parallel signal to be issued from the output latch circuit into a serial data information, a delay circuit for delaying the transfer signal in a manner that the part of time period of the data information in the transfer signal is issued at the same time period that the serial signal is issued, and a switch circuit for switching to insert the serial signal given thereto in place of the data information in the transfer signal given thereto through the delay circuit during a period when the coincidence signal is being given from the address coincidence circuit.

The master station in the above-mentioned improved species comprises a central processing unit for controlling the whole loop type data transfer system using plural transfer signals each consisting of a synchronization information part at the beginning, an address information part in the middle and a data information part at the end, a parallel-serial converter for converting parallel signal issued from the central processing unit into a serial signal to transfer it in the loop type data transfer system, a transferring buffer for once storing parallel signal of transfer signal issued from the central processing unit, a synchronized carrier generator for generating a synchronized carrier having a frequency corresponding to transfer speed of the transfer signal, a serial-parallel converter for converting received serial signal into parallel signal, using the carrier signal issued from the synchronized carrier generator as conversion timing clock signal, and a comparator for comparing parallel signal of the transfer signal once stored in the transfer buffer and the parallel signal of received serial signal converted by the serial-parallel converter, and issuing coincidence signal.

According to the above-mentioned configuration of the improved species, serial data information received by the substation is converted to the parallel data by serial-parallel converter in the substation and the parallel data are outputted to the corresponding actuator or the like, and then a new parallel data from the sensors are converted to serial data by a parallel-serial converter in the substation, and are transferred in the loop system and finally are sent to the master station. In the master station, the serial data produced and sent from the substation is again converted to parallel data by a serial-parallel converter in the master station, and the converted parallel data is compared with the original parallel data once stored in a transfer buffer and is sent to the substation in the loop system. The master station further checks whether the transferred data from the master station is rightly received by the substation and transferred rightly thereafter, and thereby a trouble shooting of the hardware becomes possible, and a highly reliable data transferring becomes possible.

Furthermore in the improved species, the data information in each substation is received and at the same time the same substation transfer the previously received synchronization information and address information to the next substation or master station. According, the delay time period in the signal transferring in the loop system can be made as short as possible, that is, only to the receiving time period of the data information, and therefore an efficient data transfer in short time becomes possible.

DETAILED DESCRIPTION OF THE PREFERRED EMBODIMENT

Figure 1:
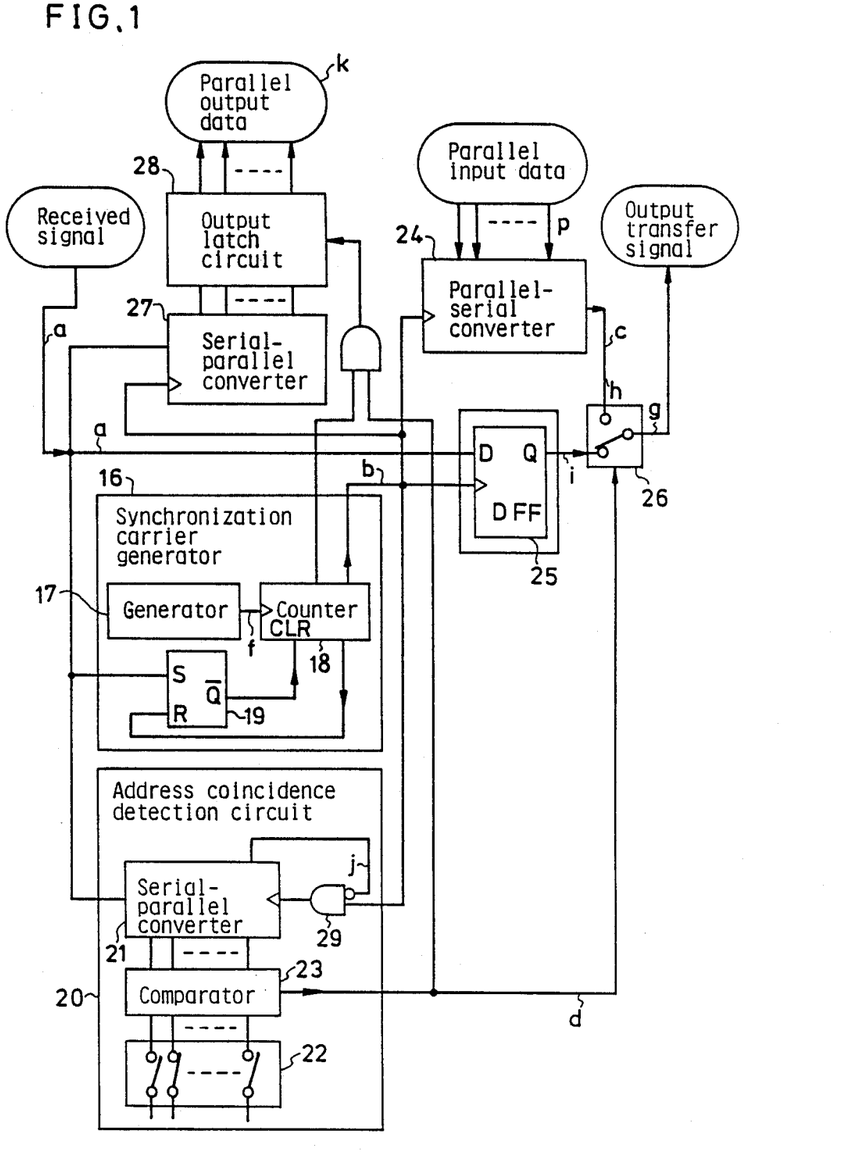
FIG. 1 is a circuit block diagram of an optical data transfer apparatus of a loop system according to the present invention.

FIG. 1 shows a first preferred embodiment of data transfer apparatus in accordance with the present invention. The configuration of the embodiment of FIG. 1 is described with reference to FIG. 2 which shows arrangement of the information signal and FIG. 3 and FIG. 4 which show waveforms of various parts of the circuit of FIG. 1. In FIG. 1, a synchronized carrier generator 16 is for generating carrier signal b which is synchronized to the transferring speed (e.g. Mbps) of the received signal a. The synchronized carrier generator 16 comprises a clock generator 17, a counter 18 constituted by for instance a digital ICLS 393 which receives the carrier signal from the synchronized carrier generator 17. An SR flipflop 19 is provided to receive the received signal a to its S terminal, and to receive the received signal a to its S terminal, and to receive output from the counter 18 to its R terminal and issues output from its $\bar{Q}$ terminal to CLR terminal of the counter 18. Therefore, when a transfer input signal a is received, the SR flipflop 19 is set and the counter 18 is released of CLR signal, and the clock signal of the clock generator 17 is frequency-divided. And therefore, a carrier signal b, which is synchronized to the transferring speed of the input received signal a, with a delay of about half pulse width of ON/OFF pulse of the received signal. The delay time period of the carrier signal from the input signal should be within the time period of one pulse width of the ON/OFF (1 and 0) pulse of the received signal, and the present embodiment has the delay time period of only half pulse width of the input signal. When the counter 18 counts up number of carrier pulses necessary for receiving the whole one frame of the transfer signal, the SR flipflop 19 is reset at the time of $t_2$. An address coincidence detection circuit 20 is for detecting address information in the received signal with the predetermined or preset address therein and memorizing the result of the coincidence in a shape of "1". The address coincidence detection circuit 20 comprises: A serial-parallel converter 21, which is constituted by a digital IC LS164 for converting serial input address information to parallel address information and store therein, and address setting switch 22, which is for preliminarily setting the desired address therein by manual setting, and a comparator 23, which is comparing the parallel converted address information from the serial-parallel converter 21 and the preset address of the substation which is set in the address setting switch 22 and issuing a coincidence memory signal d when there is a coincidence. A logic gate 29 is for retaining the parallel output state. A parallel-serial converter 24 is constituted for instance by a digital IC LS165, and is for converting parallel input data from sensors or the like, corresponding to the substation to serial. A serial delay circuit 25 is for delaying the received signal a until the same timing as the serial signal of which is issued from the parallel-serial converter 24, and is constituted by, for instance, a D-flipflop. The same carrier signal as that is given to the parallel-serial converter 24 is also given to the D-flipflop 25 as clock input, so that the same timing is obtainable for the input signal a outputted from the D-flipflop 25 as the timing of the serial signal c issued from the parallel serial converter 24. A switch circuit 26 is for switching either one of the output signal of the D-flipflop 25 (delayed received signal a) or serial signal c from the parallel serial converter 24. The switch circuit is normally connected to the i side for passing the delayed received signal a, and is driven by the output signal from the comperator 23 of the address coincidence circuit 20. When the receiving of the received signal a starts, and the time is when the receivings of synchronization information SI and address information AI has been completed, if the address coincidence signal d is being given from the comparator 23 to the switching circuit 25, the switching circuit 26 turns to h side, to pass the serial output signal c as the output signal g. On the other hand, if the coincidence signal d is not being given to the switching circuit 26, the switch 26 passes the delayed received signal a as the output signal g. A serial parallel converter 27 is for converting the serial received signal a to parallel output signal to be used for the actuators or the like in the station. An output latch circuit 28 is for latching the parallel output of the serial-parallel converter 27 at the reception of the coincidence output signal d from the comparator 23.

Figure 2:
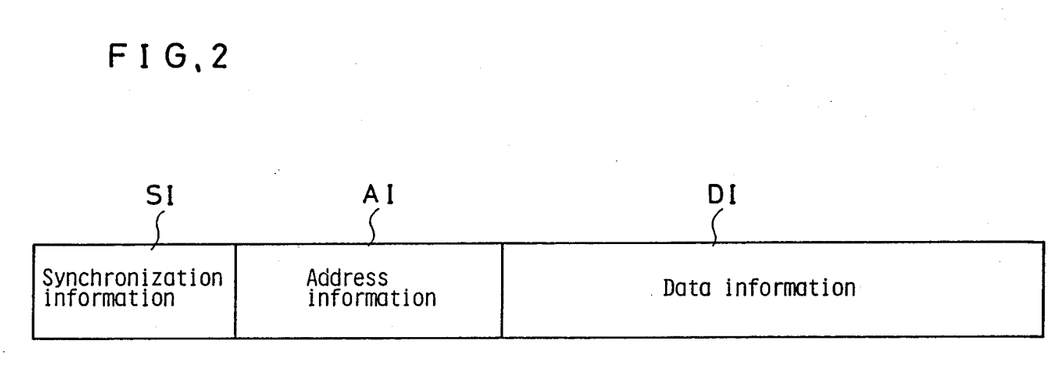
FIG. 2 is a time chart showing a transfer signal format to be used in the embodiment of FIG. 1.
Figure 3:
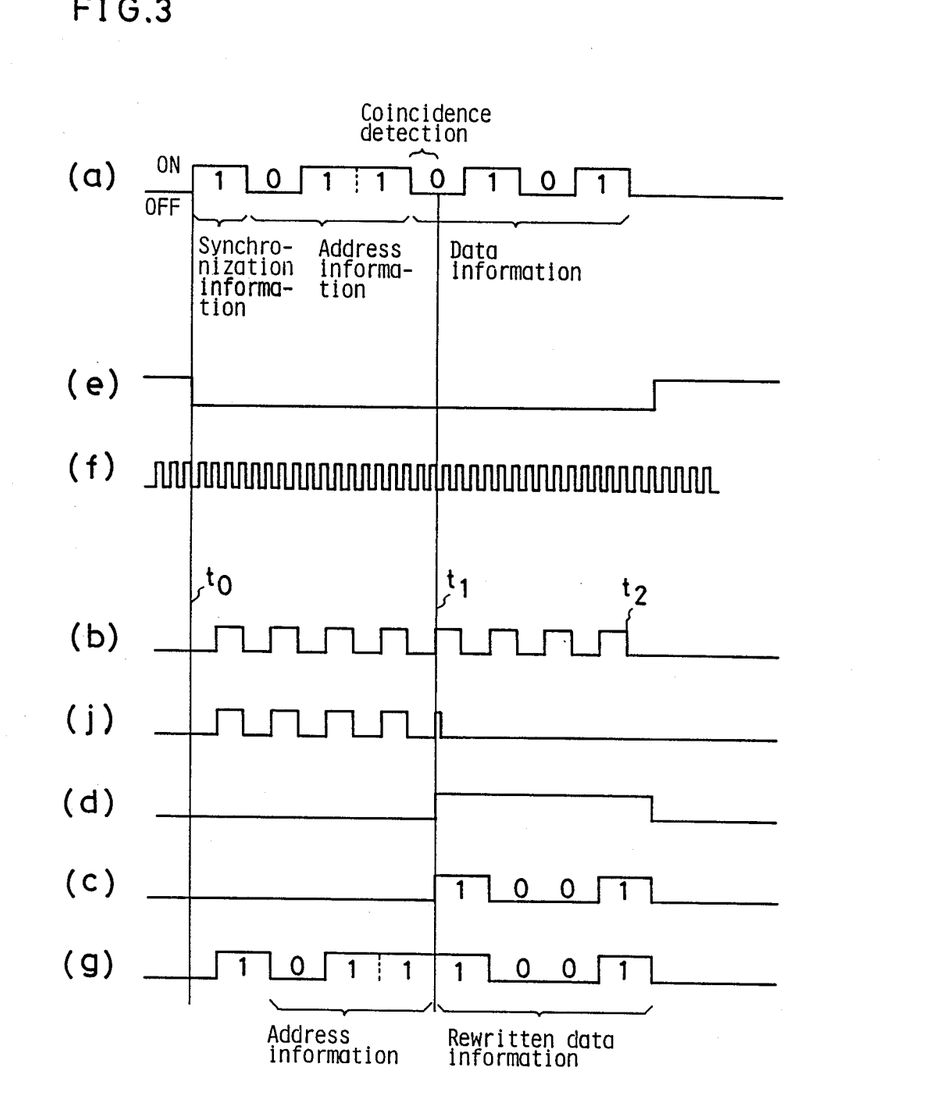
FIG. 3 and FIG. 4 are waveform charts of signal waveforms various parts of the circuit block diagram of FIG. 1.
Figure 4:
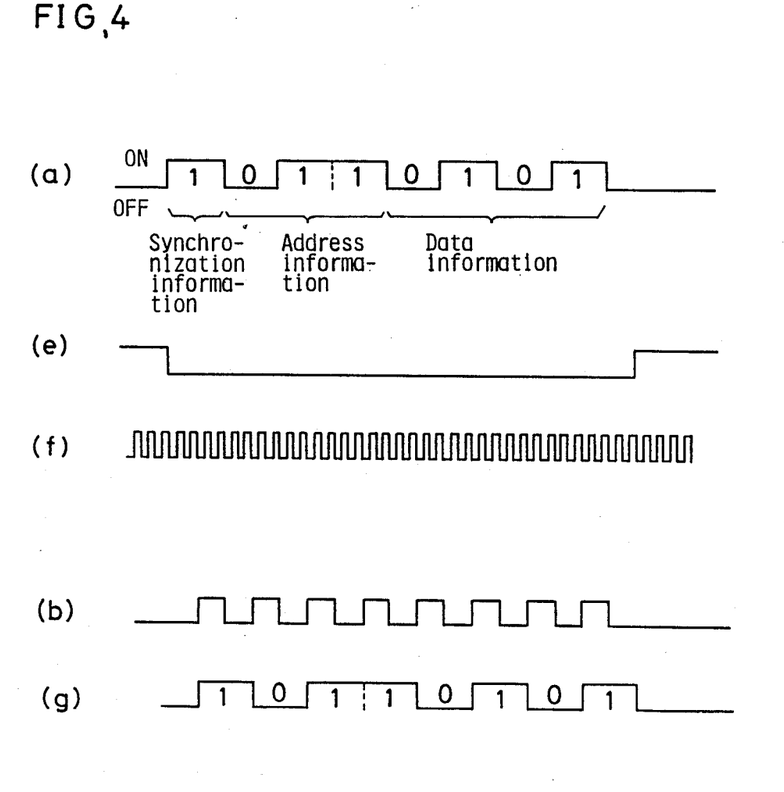

The operation of the above-mentioned circuit of the first embodiment of the data transfer apparatus is elucidated with reference to FIG. 2 which shows transfer format of the signal in the loop type transfer apparatus of the present embodiment, and to FIG. 3 and FIG. 4 which are waveform charts showing signals of various parts of the circuit.

The transfer format comprises at least synchronization information part SI for generating the synchronized carrier signal, address information part AI which has address information to select individual substation to be accessed and at a information part DI which has data given from the station or data to give to the station. And the order of transferring is first the synchronization information SI, second the address information AI and the last the data information DI.

In FIG. 3, the waveforms (a), (b), (c), (d), (e), (f), (g) and (j) shown signal waveforms of points a, b, c, d, e, f, g and j, respectively, when address coincidence is obtained. In FIG. 4, signals (a), (b), (e), (f) and (g) show signal waveforms of points a, b, e, f and g, respectively, when address coincidence is not obtained. In this case, the output transfer signal g is that which is reproduced similar to the received signal a but is reproduced delayed by the time length of only about 1 pulse width of the carrier b.

More detailed description of the operation of the loop type data transfer apparatus of FIG. 1 is as follows.

Provided that a signal a as shown in (a) of FIG. 3 is received in the substation, the SR flipflop 19 is set and frequency of the clock signal is frequency-divided by the counter 18, thereby to generate the carrier signal b shown in (b) of FIG. 3. In this example, the clock frequency is 24 MHz. The frequency dividing of the oscillated clock frequency f is made in such a manner that the carrier signal b has a frequency which is twice that of the transferring of the received signal.

The number of frequency dividing should be selected to be ¼, and in this embodiment the clock signal is divided to ¼. Accordingly the transferring frequency is 6 Mbps. The received signal a is given to the input terminal of the serial-parallel converter 21 in the address coincidence circuit 20, and the serial-parallel converter 21 makes the serial-parallel conversion of the address information by receiving necessary carrier j from the gate 29. Then the comparator 23 compares the parallel converted address information and the address set by the manual switch 22. When the two addresses are coincidence with each other, the comparator 23 issues the address coincidence signal d, thereby to switch the switch circuit 26 from i side to h side. The timing of this switching from the i side to h side is made as shown in (d) of FIG. 3, namely, at the first changing from LOW to HIGH of the carrier signal b. And thereafter, the serial output c which is parallel-serial converted from the parallel input data in that substation, is given as the transferred signal g from the switch circuit 25, as shown by (g) of FIG. 3. In this embodiment, the received signal a is delayed by the D-flipflop 25 so as to obtain the same timing as the serial output signal c, by using the clock input signal to the D-flipflop 25 as the latters clock. Accordingly, the disturbance of waveform due to the switching of the transferred signal is minimized. In FIG. 3, the delay time from the reception of the received signal a to the transferring of the signal g is determined by the time period from the reception of the signal a to the rise of the carrier signal b, and the delay in the transferring is, for instance in this embodiment, only 140-220 n sec.

On the other hand, data information in the received signal a is given to the pertinent substation as follows. The received signal a and carrier signal b are inputted to the serial-parallel converter 27 as its serial input and clock input, respectively, and thereby the serial data information is converted to the parallel information. When address coincidence exists, the output from the comparator 23 is given to the output latch circuit 28, and the parallel-converted data is latched there and is given to the pertinent actuators or the like of the substation as output data k. When the address coincidence does not exist, the switching circuit 26 rests in the i side and the received signal a is delayed by the D-flipflop 25, which, received signal a is delayed by the D-flipflop 25, which, receiving the carrier signal b, issues output signal through the switching circuit 26 as shown by (g) of FIG. 4. The waveform (g) is the same waveform as that of the received signal a but is delayed by 1 pulse width of the carrier signal b of FIG. 3. At that time, the parallel input data of the station is not transferred.

As is clear from the above-mentioned first embodiment of the present invention, the data transfer apparatus in accordance with the present invention has very small transfer delay, since the received signal is not stored as a whole in a memory of the respective transfer apparatus like the prior art, but the data information is replaced to that of the respective substations at the midway time of the receiving when the address information makes coincidence with the preset one in the station at the midway of the receiving. And furthermore, since the received signal is delayed to the same timing as that of the serial signal from the parallel-serial converter 24 by means of using the same timing clock pulse to the parallel serial converter 24 to the D-flipflop 25, there is no disturbance of the waveform at the switching of the switching circuit 26 for inserting the serial information o to the output signal g.

Furthermore, the embodiment has the below-mentioned technical advantage: In the conventional optical transferring of the information, duty ratio of the ON-/OFF pulse signal of the electric signal is likely to change from that of the original optical signal, depending on the amount of the received light. And such variation causes distortion in the pulse width in the electric signal, and therefore during repetition of optoelectric conversions and electroptic conversions, the pulse width distortion is accumulated, and finally normal transferring of information becomes impossible. And further, in the conventional electric signal transferring, as the transferring rate (bps) is increased, the pulse width distortion is induced due to capacitance in the electric wiring, and the similar problem as above is liable. On the contrary, in the present invention, by utilizing the D-flipflop as the serial signal delay circuit, the duty ratio of the optical or electrical ON/OFF signals are retained always in a right relations, and the waveform shaping can be made, too. Therefore, even the information transfer apparatus according to the present invention can be used in a plurality in a loop type system, normal data transferring is assured.

Figure 5:
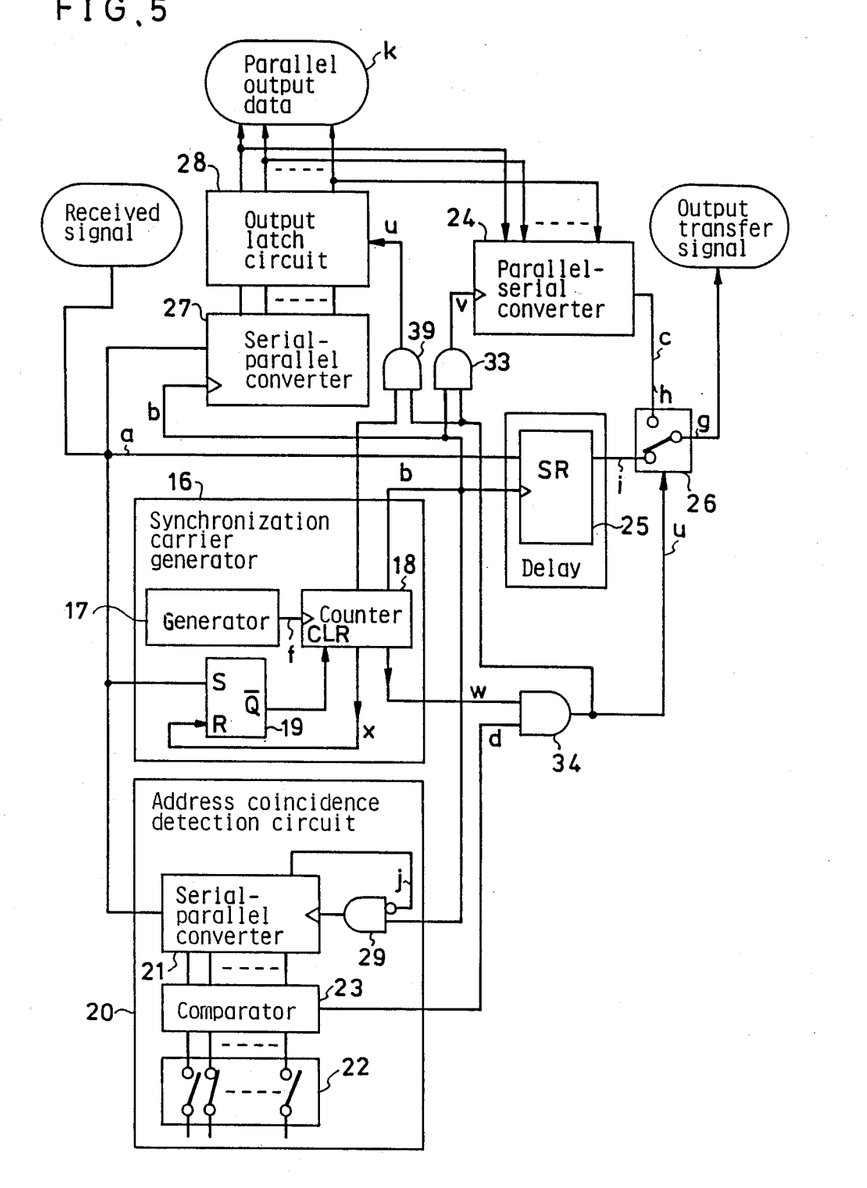
FIG. 5 is a circuit block diagram of a second preferred embodiment of a loop system according to the present invention.
Figure 6:
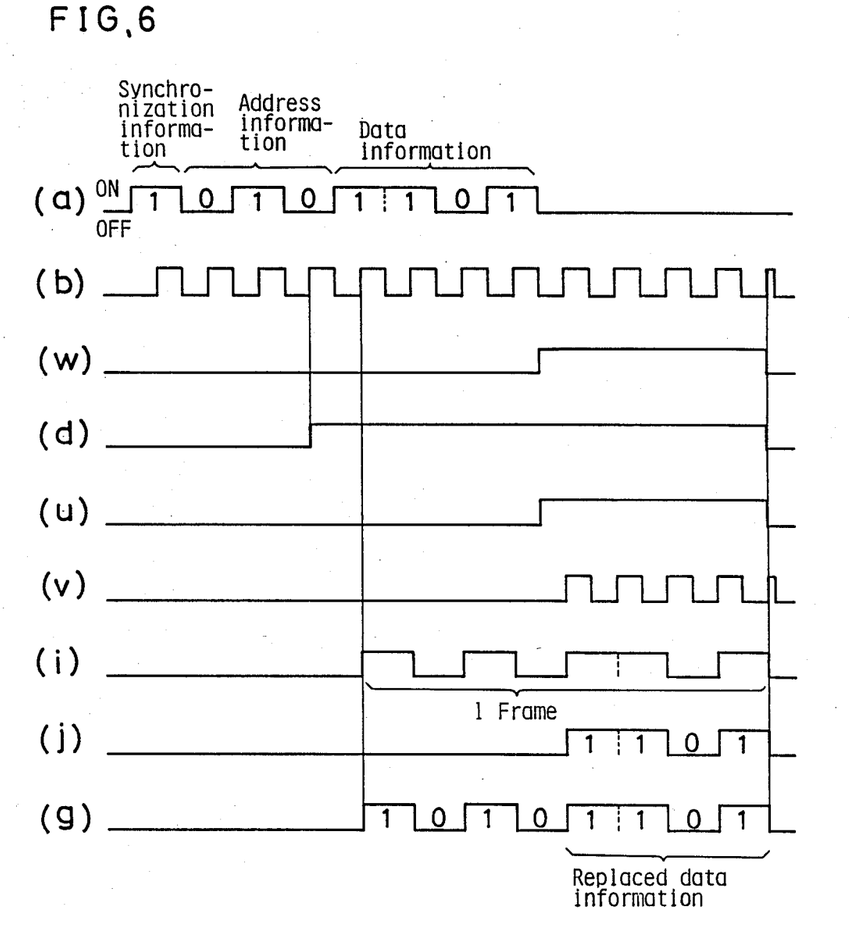
FIG. 6 and FIG. 7 are waveform charts of signal waveforms various parts of the circuit block diagram of FIG. 5.
Figure 7:
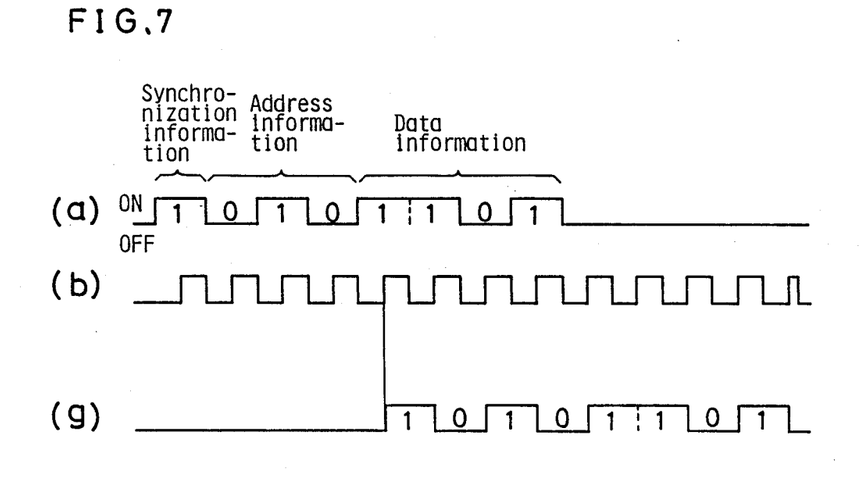

FIG. 5 through FIG. 9 shows second embodiment, wherein FIG. 5 is a circuit block diagram of a substation of a loop type data transferring system. Substantial parts of the circuit of FIG. 5 is constituted similar to the circuit of FIG. 1, and the same numerals designate the similar or corresponding parts, and the following descriptions are made mainly on different parts from the circuit of FIG. 1. In FIG. 5, the counter 18 counts up number of carrier pulses necessary for receiving the whole information of 1 frame of the transferred signal a, and upon completion of the count it issues a data reception completion signal w to an AND circuit 34. Further the parallel output data k which is output from the output latch circuit 28 is given to a parallel-serial converter 24, which converts the parallel output data to a serial information and gives it to a switching circuit 26. The parallel-serial converter 24 receives the timing output of the counter 18 as clock signal through AND circuit 33. When the counter 18 counts up the number of carriers pulses which is necessary for transferring the whole 1 frame of information to cover the serial signal c from the parallel serial converter 24, the output x of the counter resets the SR flipflop 19, which then waits for receiving. A serial-parallel converter 27 is constituted by a logic IC LS164, and is for converting the serial data information to parallel signal by receiving the synchronized carrier signal b as clock input thereto. The output latch circuit 28 is constituted by e.g. a digital IC LS273, and is for latching the parallel output signal from the serial-parallel converter 27 by receiving output data latch signal u, and output parallel data k. An AND logic 34 is for making logic of data reception completion signal from the timing counter 18 and address coincidence from the comparator 23, and issuing the output data latch signal u only when the address information of the transferred signal a and the address set switch 22 coincide with each other. The parallel-serial converter 24 is constituted by a digital IC, for instance LS165, and converts the parallel output data k to serial signal c by reception of the signal v from AND logic gate 33 which passes the synchronized carrier signal b from the timing counter 18 only after the operation of the output data latch. A serial signal delay circuit 25 is a delay circuit constituted by a shift resister which delays the received signal a to the timing of issuing of the serial signal from the parallel-serial converter 24. In this embodiment, the delay circuit 25 is constituted by a digital IC LS164 or the like serial-parallel converter to which synchronized carrier signal b is given as clock input, so that the received signal a is delayed to the same timing as the outputted serial signal c from the parallel serial converter 24. In FIG. 6, the waveforms (a), (b), (w), (d), (u), (v), (i), (j) and (g) are waveforms of signal at the points a, b, w, d, u, v, i, j and g, respectively, when the address coincidence is obtained. In FIG. 7, the waveforms (a), (b) and (g) are waveforms of signals at the points shown by a, b and g, respectively, when the address coincidence is not obtained. By comparing the waveforms (a) and (g) of FIG. 7, it is apparent that the output signal g issued from the switching circuit 26 is reproduced with such a short delay of only the time period of "receiving time of the data information" plus "half period of the synchronized carrier b." The operation of the above-mentioned data transfer apparatus of loop type is elucidated with reference to FIG. 5, FIG. 6 and FIG. 7, mainly on the parts which is different from the operation of the first embodiment.

When the address coincidence exists;

In this case, at the point of time when the whole one frame is received, the output data latch signal u is given from the counter 18 through the AND gate 34 and through and AND gate 39 to the output latch circuit 28, which then outputs the parallel data k. This parallel output data k is simultaneously given to the parallel-serial converter 24, and therefore, after the latching it is converted to the serial signal at the timing of the carrier signal b after the latching. On the other had, the switching circuit 26 is changed over from the i-side to the h-side. Therefore, the transfer output signal g becomes to have the contents of the serial signal c given from the parallel-serial converter 24. In this embodiment, in the switching of the data from the received signal a to the serial-re-converted data information, the received signal a is delayed so as to have same timing as the serial signal c by means of the serial signal delay circuit 25 which, receives the carrier signal b as clock signal. Therefore, wave shape disturbance due to the switching of the transfer signal is substantially negligible.

When address coincidence does not exist:

In this non-coincidence case, the switch circuit 25 remains in the i-side. Therefore, the received signal a is transferred to become the output transfer signal g through the delay circuit 25. This case also, since the carrier signal b is given as clock signal to the delay circuit 25, the output transfer signal g has the quite same waveform as that of the received signal a.

Next, one example of the circuit configuration of the control station or master station 5 shown in the general system diagram of FIG. 10 is described. The circuit of FIG. 8 has a CPU35 which is for controlling the whole system of the loop type data transfer apparatus system. A parallel-serial converter 36 constituted by a digital IC LS165, is connected to the CPU so as to receive the parallel output signal therefrom and converting them into a serial signal r for transferring to the substations outside of the drawing. A transferring buffer 37 is connected to the CPU. A serial-parallel converter 39 is constituted for instance by a digital IC LS164 which converts received signal 1 from a substation to parallel signal. A comparator 38 constituted by a digital IC for instance LS85 is provided so as to receive the parallel signals q and p, from the serial parallel converter 39 and the transferring buffer 27, respectively, to compare them and issues a coincidence signal o when both parallel signals are coincident each other. An AND gate 41 receives the coincidence signal o and a detection timing signal s from a synchronized carrier generator 40, which receives signal from the input signal. The output of the AND gate 41 is given to the CPU35. The synchronized carrier generator 40 issues a carrier signal n which is corresponding to the transmission rate of the received signal 1, and further issues a timing signal m for making the transferring buffer 37 output the parallel data p to the comprator 38 and the timing signal s to the AND gate 41.

Figure 8:
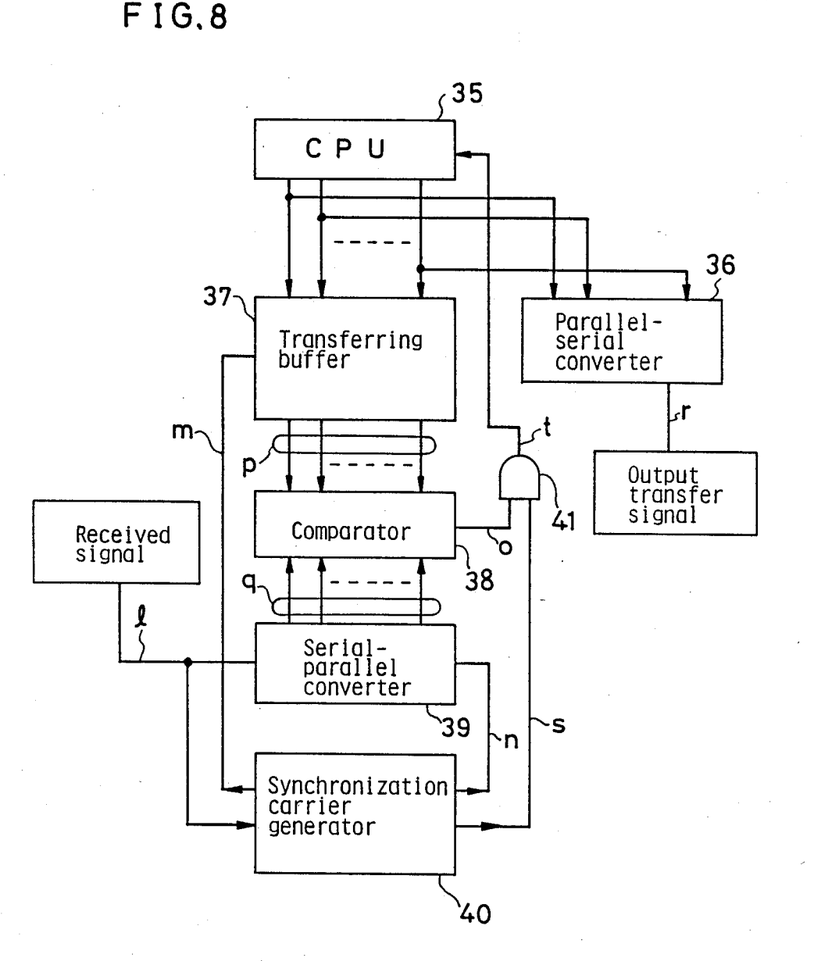
FIG. 8 is a block diagram of a master station of the second embodiment of FIG. 8.
Figure 9:
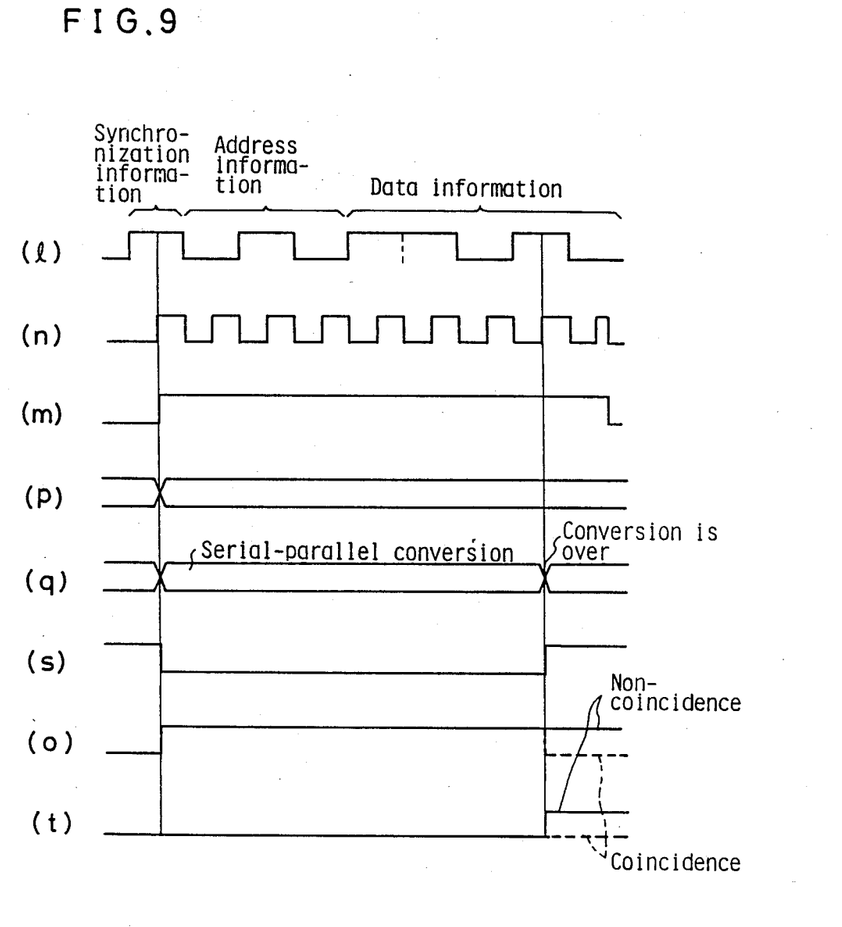
FIG. 9 is a waveform chart showing signal waveforms of various parts of the circuit block diagram of FIG. 8.

In FIG. 9, waveforms (1), (n), (m), (p), (q), (s), (o) and (t) show waveforms of the points of the same marks in the circuit of FIG. 8.

Provided that, a received signal 1 of FIG. 9 is received, the synchronized carrier generator 40 generates a carrier signal n which has a frequency twice of that of the received signal as shown by the waveform (n) of FIG. 9. At that time the transferring buffer 37 issues parallel data "p" at reception of the timing signal m of FIG. 9 from the synchronized carrier generator 40. The received signal 1 is converted to parallel signal q by the serial-parallel converter 39, taking the carrier signal n as its click signal. The parallel signal p and the parallel signal q are compared by the comparator 38 and issues a coincidence signal o as shown in the wave form (o) of FIG. 9 when the both parallel signals coincide each other. The output o of the comparator 38 is given to the AND circuit 41, whereby an AND logic with the synchronized carrier s is produced to make a judge signal t which is given to the CPU35 examines the judge signal t with its original data and finally judges whether the data transferred from this control station and the data received from the substation after one turn travelling through the loop system are exactly the same or not. And from that result of the final check, any defect of the hardware in the system is traced.

According to the second embodiment, since the data received from the substation 3, 4, . . . which is once outputted to actuators in the substation and thereafter transferred to the master station or control station 5 through serial-parallel conversion and parallel-serial conversion, the control station or master station 5 can confirm the data which is actually outputted by the substation 3, 4, . . . And therefore the checking of the hardware is very reliable. Furthermore, technical advantages of the first embodiment is also enjoyable in this second embodiment.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A data transfer apparatus comprising:
   an address coincidence circuit for detecting coincidence of address information included in a transfer signal consisting of synchronization information, said address information and data information, by comparing said address information with a predetermined address, and for memorizing said coincidence and issuing a coincidence signal, a synchronized carrier generator for generating carrier signal which is corresponding to transfer speed of said transfer signal, a parallel-serial converter for converting parallel data information to serial signal by using said carrier signal issued from said synchronized carrier generator as latch-timing signal, a delay circuit for delaying said transfer signal in a manner that the part of time period of said data information in said transfer signal is issued at the same time period that said serial signal is issued, and a switch circuit for switching to insert said serial signal given thereto in place of said data information in said transfer signal given thereto through said delay circuit during a period when said coincidence signal is being given from said address coincidence circuit.

2. A data transfer apparatus comprising:

an address coincidence circuit for detecting coincidence of address information included in a transfer signal consisting of synchronization information, said address information and data information, by comparing said address information with a predetermined address, and for memorizing said coincidence and issuing a coincidence signal, a synchronized carrier generator for generating carrier signal which is corresponding to transfer speed of said transfer signal, a serial-parallel converter for converting serial data information of received transfer signal into output parallel signal by using carrier signal issued from said synchronized carrier generator as conversion timing clock, an output latch circuit for latching output parallel signal converted from said serial signal by said serial-parallel converter, a parallel-serial converter for converting said output parallel signal to be issued from said output latch circuit into a serial data information, a delay circuit for delaying said transfer signal in a manner that the part of time period of said data information in said transfer signal is issued at the same time period that said serial signal is issued, and a switch circuit for switching to insert said serial signal given thereto in place of said data information in said transfer signal given thereto through said delay circuit during a period when said coincidence signal is being given from said address coincidence circuit.

* * * * *

UNITED STATES PATENT AND TRADEMARK OFFICE
CERTIFICATE OF CORRECTION

PATENT NO. : 4,847,613

DATED : July 11, 1989

INVENTOR(S) : Tutomu SAKURAI, et al.

It is certified that error appears in the above-identified patent and that said Letters Patent is hereby corrected as shown below:

On the title page:

[30] Foreign Application Priority Data

Jul. 15, 1986 [JP]   Japan         61-165830

Feb. 20, 1987 [JP]   Japan         62-38453

Signed and Sealed this

Seventh Day of May, 1991

*Attest:*

HARRY F. MANBECK, JR.

*Attesting Officer*   *Commissioner of Patents and Trademarks*